(No Model.)
C. SPARKS.
HOSE CLAMP.
No. 565,698.  Patented Aug. 11, 1896.
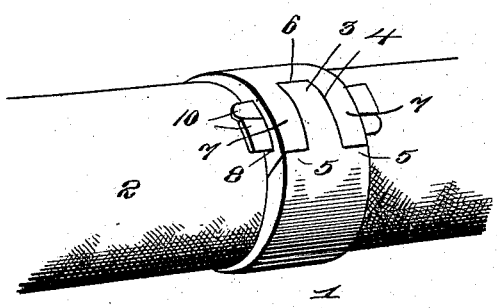
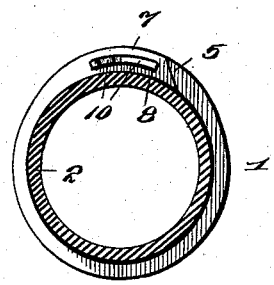
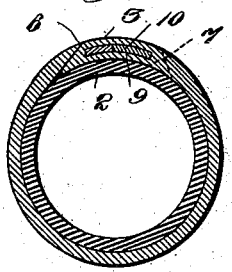
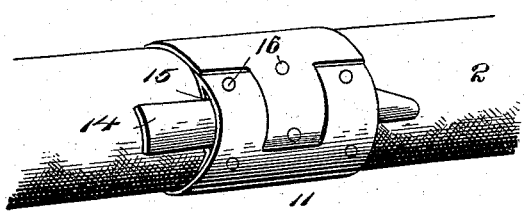
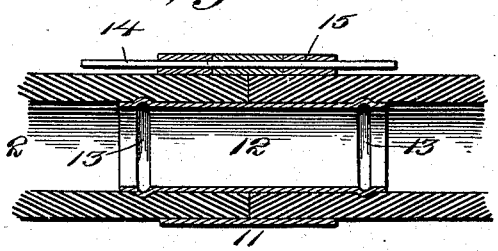
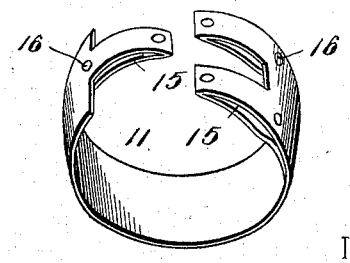
Witnesses
Inventor
Charles Sparks,
By his Attorneys,
C. A. Snow & Co.

UNITED STATES PATENT OFFICE.

CHARLES SPARKS, OF PACIFIC GROVE, CALIFORNIA, ASSIGNOR OF ONE-HALF TO J. H. PLUMB AND J. S. METTEER, OF SAME PLACE.

HOSE-CLAMP.

SPECIFICATION forming part of Letters Patent No. 565,698, dated August 11, 1896.

Application filed April 7, 1896. Serial No. 586,590. (No model.)

*To all whom it may concern:*

Be it known that I, CHARLES SPARKS, a citizen of the United States, residing at Pacific Grove, in the county of Monterey and State of California, have invented a new and useful Hose-Clamp, of which the following is a specification.

My invention relates to hose-clamps adapted for use in connection with air-brake, fire-engine, and other hose for securing the extremities thereof to the members of hose-couplings, and for similar purposes; and the object in view is to provide a simple, inexpensive, and efficient device having sufficient compressive power to accomplish the desired object without the use of projections such as the tightening-bolts now in common use in devices of this class, whereby the projection of the clamp beyond the exterior surface of the hose is slight and does not interfere with the operation of extending the hose or carrying it through openings.

Further objects and advantages of this invention will appear in the following description, and the novel features thereof will be particularly pointed out in the appended claims.

In the drawings, Figure 1 is a perspective view of a clamp embodying my invention, applied in the operative position to a hose, the form of clamp shown being especially adapted for use in connection with air-brake and fire-engine hose. Fig. 2 is an edge view of the interlocking extremities of the same. Fig. 3 is a longitudinal section of the interlocking extremities taken through the tongue or extension of one of the extremities. Fig. 4 is a perspective view of a slightly-modified form of the clamp adapted for use in connection with garden and similar hose. Fig. 5 is a longitudinal central section of the same, taken through the hose, to illustrate the tubular core which is employed in connection therewith for mending purposes. Fig. 6 is an edge view of the clamp illustrated in Fig. 5, with the extremities separated.

Similar numerals of reference indicate corresponding parts in all the figures of the drawings.

The clamp 1, embodying my invention, consists of a band of resilient or spring metal constructed to encircle a hose 2, and provided at its contiguous extremities, respectively, with a tongue or extension 3, and a receiving recess or slot 4 to form an interlocking joint or connection. The lateral shoulders 5 at opposite sides of the tongue or extension 3 are beveled or undercut, and the shoulder 6 at the inner end of the recess or slot is similarly undercut or beveled, while the extremity of the tongue or extension is tapered to pass under the shoulder 6, and the extremities of the side tongues 7, at opposite sides of the recess or slot 4, are similarly tapered to pass under the shoulders 5. Thus when the extremities of the clamp are connected to interlock the central tongue or extension 3 with the lateral tongues 7, the extremities of said tongues will pass, respectively, under the shoulders 6 and 5 and will thus be concealed and protected.

Transverse registering key-seats 8 and 9 are formed, respectively, in the tongues 3 and 7 for the reception of a transversely-tapered key or keys 10. When two keys are shown, as illustrated in Figs. 1, 2, and 3, they are inserted from opposite sides, and by driving them firmly into the seat any desired compression of the hose may be attained.

In the form of my invention illustrated in Figs. 4 to 6 the band 11 is preferably made of greater width and may be made of thinner material, as shown, the construction of the interlocking tongues and the arrangement of parts whereby the extremities of said tongues are received and concealed under the shoulders at the bases of the tongues being, however, the same as that above described. This form of clamp is preferably used in connection with garden-hose for mending purposes, and is used in combination with a tubular core 12, which is adapted to be inserted in the bore of the hose to cover a break or hole therein, said core being provided near its extremities with circumferential ribs 13, and the clamp being arranged to embrace and compress the hose at a point between said ribs. In this form of clamp a single key 14 may be employed for engaging the transversely-alined key-seats 15. In practise I prefer to construct this form of band of sheet metal, the seats 15 being secured by doubling the extremities of the blank upon themselves, the terminals thereof being secured to the inner surface of the body portion of the blank and the seats being bounded at their inner and outer ends by rivets 16. The extremities of the tongues are reduced to pass freely under the shoulders, respectively, upon opposite sides of the single tongue and between the twin tongues.

Various changes in the form, proportion, and the minor details of construction may be resorted to without departing from the spirit or sacrificing any of the advantages of this invention.

Having described my invention, what I claim is—

1. A clamp for the purpose named, consisting of a band provided at its extremities with interlocking intermediate and lateral tongues having tapered extremities and transversely-registering key-seats, extremities of said tongues being adapted to underlap for concealment by the shoulders arranged respectively at the bases of the tongues, substantially as specified.

2. A clamp for the purpose named, consisting of a band provided at its extremities with interlocking intermediate and lateral tongues having tapered extremities and transversely-alined key-seats, the shoulders at the bases of the tongues being undercut or beveled to overlap the tapered extremities of the tongues and duplicate oppositely-arranged tapered keys engaging said key-seats, substantially as specified.

3. A clamp for the purpose named, consisting of a band provided at its extremities with interlocking intermediate and lateral tongues having tapered extremities and transversely-alined key-seats, the extremities of said tongues being adapted to underlap the shoulders arranged respectively at the bases of the tongues, said tongues being formed by folding the extremities of the blank inwardly upon themselves and permanently securing them by fastening devices located, respectively, upon opposite sides of the key-seats, and a tapered key engaging said seats, substantially as specified.

In testimony that I claim the foregoing as my own I have hereto affixed my signature in the presence of two witnesses.

CHARLES SPARKS.

Witnesses:
W. W. JAMES,
GRANT TOWLE.